Dec. 24, 1968                F. WEBSTER                3,418,023
              LONGWALL COAL-CUTTING MACHINE
Filed Nov. 14, 1966                          2 Sheets-Sheet 1

INVENTOR
FREDERICK WEBSTER
BY *Watson, Cole,
Grindle & Watson*
ATTORNEYS

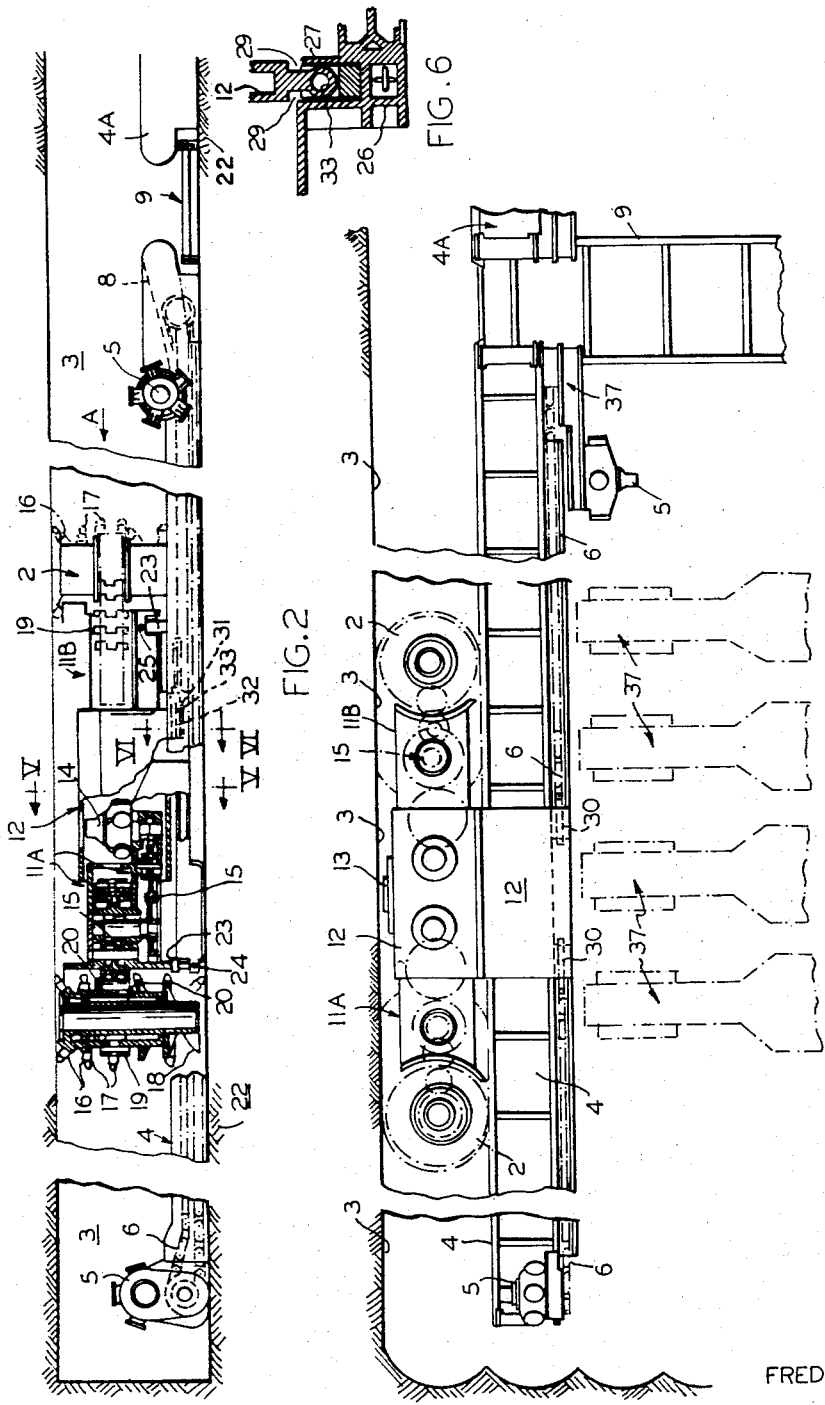

3,418,023
LONGWALL COAL-CUTTING MACHINE
Frederick Webster, Sheffield, England, assignor to
Webster Machine Development Limited
Filed Nov. 14, 1966, Ser. No. 594,231
Claims priority, application Great Britain, Nov. 18, 1965,
49,967/65
3 Claims. (Cl. 299—43)

ABSTRACT OF THE DISCLOSURE

A longwall coal-cutting machine of the type including two vertical axis cutting drums enabling the machine to cut in both directions of an armoured base conveyor, a frame for the drums located wholly to the face side of the armoured base conveyor and pivotally attached to a support guided by the conveyor and, a hydraulically adjustable support in the area of each cutting drum adapted to rest on and be movable along the floor formed by the bottom end of whichever is the leading drum.

---

This invention relates to coal-cutting machines of the type intended to be guided by and movable in both directions lengthwise of a conveyor, and provided with two vertical axis cutting drums, the overall lengthwise dimension of the drums exceeding that of the frame of the machine by which the drums are supported and from which they are driven, so that the machine effects cutting of the coal by whichever is the leading drum in the particular direction of movement of the machine. Cutting may therefore be performed by at least one drum that is moved to a limiting position somewhat beyond the end of the conveyor adjacent to such limiting position, so that coal is removed from a space immediately wide enough to receive that end of the conveyor as the conveyor and the machine are advanced for the performance of the next cutting movement along the conveyor.

A machine of this type is capable of removing coal at a high rate from the seam: perhaps 2 or even 3 tons per minute. For the machine to be fully effective, the conveyor with which it is used must be capable of disposing of the coal at an equivalent high rate; and this purpose is best-served by a scraper chain conveyor (the armoured side troughing of which serves for the guiding of the machine), provided free passage for the full complement of coal can be maintained up to and at the discharge position of the conveyor, where the coal is transferred to another conveyor. To provide for the discharge of the coal, the scraper conveyor must have its upper run inclined upwardly to the discharge position from the low level necessary over the major part of its length—low because the height of the conveyor is a material factor, in conjunction with the height of machine above the conveyor, in enabling the whole equipment to be utilised in relatively thin seams. Whether the raised discharge position is at one end of the scraper conveyor beyond which one cutting drum must pass, or is intermediate of the length of a conveyor consisting of two oppositely moving scraper chains, each inclined upwardly to reach that position, when the discharge position is necessarily passed in movement of the machine in either direction, the capacity of the conveyor is reduced by the protrusion of the supporting and driving frame for the drums over the conveyor in machines as so far constructed. There is therefore a restriction imposed by the conveyor on the utilisation of the inherent capacity of the machine to win coal at a high rate. For this reason, use of this type of machine has been substantially confined to the formation of stable holes at the ends of a face served by a separate long-wall machine of one kind or other.

The object of the invention, therefore, is to enable this type of machine to be used without restriction imposed by the conveyor so that the full winning capacity can be utilised in whatever kind of operation the machine is used. As will appear below, the machine according to the invention can not only be used to form stable holes but may be used for the entire winning of coal from the working.

According to the present invention, a coal-cutting machine of the type referred to comprises a support to be guided alongside a scraper-chain conveyor, the supporting and driving frame for the two vertical cutting drums lying wholly to the face side of the conveyor and short of the vertical plane to which the face-sides of the drums extend, the frame having a horizontal pivot connection lengthwise of the guiding support and also being provided with a downwardly extending support to rest on and move along the floor formed by the bottom end of the drum that is foremost in whichever direction the machine moves alongside the conveyor.

The conveyor is nowwhere obstructed in its length by the supporting and driving frame, and it can therefore carry the full complement of coal removed and transferred to it by the drums as the machine operates over the full length of the conveyor, with no impedance to the passage of the coal to the raised discharge position, whether this position is at one end of the conveyor or intermediately of its length.

The horizontal lengthwise pivot connection of the guiding support may be included in a gimbal that provides for tilting of the connection about a transverse horizontal axis, so as to allow the drums to follow lengthwise inclination of the floor. Particularly in this case, the downwardly extending support from the frame towards the floor is advantageously duplex, there being one supporting member near one end of the frame and another near the other. The support is preferably adjustable in extent, preferably under hydraulic control, served by pressure fluid from the hydraulic system of the machine. Thus, forward and rear supports in the form of hydraulic rams may be served by a common supply so as to provide balanced support regardless of irregularities in the floor.

The guiding support may be extended to bridge the scraper-chain conveyor alongside which it is guided from the face-side to the gob side, where it may be both supported and guided by that side of the conveyor trough. The bridge, unrestricted in height by the frame because the latter lies beyond the conveyor, allows unimpeded passage of the coal on the conveyor. The pivot connection to the support may be made at the face side, gob side or at the top, or at the junction of these parts of the bridge support. The gob side of the bridge provides a convenient attachment location for a haulage chain for the machine.

Again, the scraper conveyor may be spanned by an arm from the frame when the latter is supported and guided solely by the face-side of the scraper conveyor, the arm providing an attachment for the haulage chain.

The supporting and driving frame for the vertical drums containing the usual driving motor, preferably hydraulic, and reduction gearing for the driving of upper and lower sections constituting each cutting drum. The drive to the sections may be directly through gearing into a projection from which the sections are vertically journalled, when one or more cutting chains may be separately sprocket-driven from the motor-gearing, to remove coal over the height occupied by the projection between the section, the chains running over guide surfaces at the exposed part of the projection. Alternatively, the sections themselves may be rotated by a co-axial sprocket driven by a cutting chain, itself sprocket-driven from the motor-gearing. The width of the frame disposed between the face-side of the scraper-chain conveyor and the vertical cutting plane of the drums adequately houses this driving mechanism, the total weight of the frame and its mechanism, together with the drums, being largely supported by the floor.

The machine may be used with either a rigid conveyor, or with a flexible conveyor capable of being "snaked" as it is advanced towards the newly formed face as the working advances. The advance of the conveyor in each case is preferably by hydraulic jacks, which may be remotely controlled, and may be used to force onto the conveyor coal that has not passed directly to it from the drums.

By bringing the conveyor and the machine to an oblique position, driving of the machine enables it to sump itself progressively into the face to full working depth at one end, after which reverse driving of the machine and advancing of the conveyor, e.g., by "snaking," enables cutting to proceed in the opposite direction until the full depth of cut is being taken. A single machine may thus be used to form a stable hole at one end of a long-wall face. However, by the use of a plurality of machines end-to-end, winning of coal from an entire working stint may be performed, say four machines together covering a face of 150 yards. The conveyor of each machine can discharge to a short conveyor with all of the latter discharging to a high capacity conveyor running along the gob side and discharging the output of all the machines to a main gate conveyor. Yet again, a single machine can operate as a long-wall shearer machine by running along a conveyor co-extensive with the wall-length, "snaking" of the end portions of the conveyor enabling the full depth of cut to be quickly achieved by tapering the run of the machine into the face, the machine completing a full traverse of the wall and being returned similarly in the opposite direction.

Because the supporting and driving frame lies close to the face being cut, roof supports can be advanced, possibly by remote control, over the scraper-chain conveyor, so that little more than the newly-cut roof remains temporarily unsupported.

The invention will now be further described by way of example with reference to the accompanying drawings in which:

FIGURE 2 is an enlarged view of FIGURE 1, partly in section;

FIGURE 3 is a plan view of FIGURE 2;

FIGURE 6 is a section on the line VI—VI of FIGURE 2.

Figure 1:
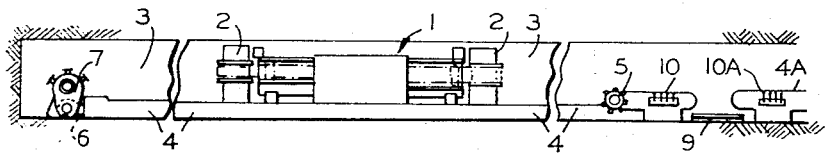
FIGURE 1 is a diagrammatic view of the general arrangement of the machine, from the rear of the machine.

In FIGURE 1, the machine is indicated as 1, having cutting drums 2 to work a longwall face 3 and being guided by face conveyor 4 with a drive motor 5 and hauled along by haulage chains 6 and hydraulic motor 7. The conveyor 4 has a raised discharge end 8 to discharge material onto transverse conveyor 9, the various devices being controlled by a bank of control valves 10. For clarity, all roof supports have been omitted from this figure.

Figure 5:
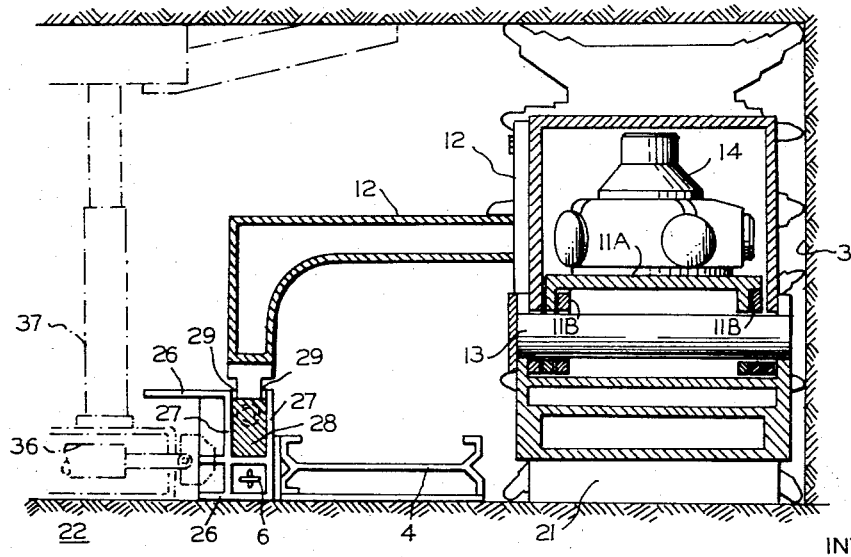
FIGURE 5 is a section on the line V—V of FIGURE 2.

In FIGURES 2 and 3 it can be seen that the machine is constructed in two parts, consisting of supporting and driving frames 11A, 11B for each cutting drum and a guided support forming a bridge being indicated generally as 12. The frames 11A, 11B are pivotally connected to one another on a central, transverse pin 13 (FIGURE 5), each frame including a hydraulic motor 14, reduction gearing 15 and a cutting drum 2, each drum being provided with pick boxes 16 and picks 17 and a portion of coal elevating vane 18, and, over the height of the drum occupied by the gear drive, a pick carrying chain 19 driven by sprockets 20 on each drum to provide a cutting capacity over that height. The drive to the drums is described in greater detail in my U.S. patent application Ser. No. 594,037.

The pin 13 is secured above and by a base member 21 which rests on the floor 22 of the workings and projects under both frames of the machine as far as the cutting drums 2. A pair of hydraulic jacks 23 are pivotally secured at 24 to each end of the base member 21 and at 25 to each frame of the machine.

Figure 4:
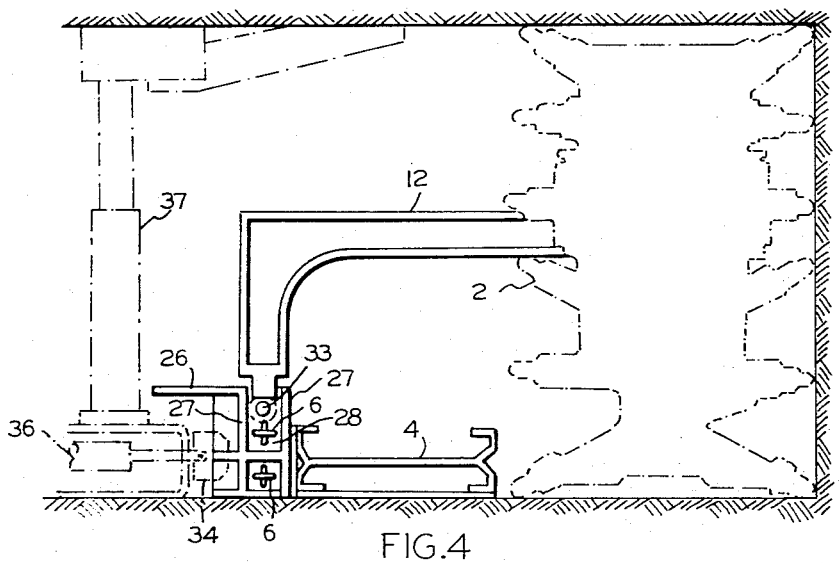
FIGURE 4 is a view in the direction of an arrow A of FIGURE 2.

Along the entire length of the gob side of the conveyor 4 is secured a fabricated slideway indicated generally as 26 (FIGURES 4, 5 and 6), with vertical walls 27 accommodating a slide block 28, the vertical walls and lower part of the guided support 12 having clearance 29 at both sides. The slideway 26 also houses upper and lower runs of haulage chain 6 secured at 30 to the block. The slide block 28 has, near each end, a recess 31 to accommodate a projection 32 of the support 12, pivotally secured on pin 33. At intervals along the conveyor 4 are a number of piston and cylinder units 36, secured to conventional self-advancing roof supports 37, the units 36 serving to advance the conveyor.

Thus, with motor 5 driving the conveyor 4 driven through gearbox 38, the leading cutting drum 2 (which depends upon the direction of travel) powered by motor 14 through reduction gearing 15 and the machine hauled along the longwall face 3 by actuation of motor 7, coal is thrown onto conveyor 4 which is able to operate at maximum capacity due to there being no protrusion over the conveyor by the supporting and driving frames 11A, 11B for the drums.

The face conveyor 4 discharges onto transverse conveyor 9 and, if several machines are working side-by-side conveyor 4A of the adjacent machine may also discharge onto conveyor 9. Consequently control valves 10A for adjacent machines are situated in close proximity so that two machines can be controlled by one operator.

To enable minor undulations of the coal seam to be followed by the cutting drums, jacks 23 are actuated, either individually or separately, so that each frame may move about pin 13 and pins 33 within the clearances 29.

When the machine has been run along the entire length of the face, the end of the conveyor 4 remote from the machine is advanced obliquely into the face by actuation of the piston and cylinder units 36 at that end, to enable the drums to sump into working depth. Upon completion of that cut the remainder of the units 36 are then advanced and the procedure repeated so that the machine can be traversed in the opposite direction.

What I claim is:

1. A coal-cutting machine of the type intended to be guided by and movable in both directions lengthwise of an armoured face conveyor and provided with two vertical axis cutting drums, the overall lengthwise dimension of which drums exceeds that of the frame of the machine by which the drums are supported and from which they are driven so that the machine effects cutting of the coal by whichever is the leading drum in the particular direction of movement, comprising:

a support guided by said armoured face conveyor;

a frame attached to said support through pivot means, said frame being located wholly to the face side of said conveyor;

said cutting drums mounted one at each end of said frame with the face sides of each said drum extending beyond said frame at the face side of said frame; and a downwardly extending support adjustable under hydraulic control and located adjacent each said cutting drum adapted to rest on and be movable along the floor formed by the bottom end of one of said drums which is foremost in whichever direction the machine moves along said conveyor.

2. A coal-cutting machine according to claim 1 wherein said support is extended to bridge said armoured face conveyor along which it is guided.

3. A coal-cutting machine according to claim 1 wherein said frame is provided with a transversely extending arm spanning said conveyor when said arm is supported and guided solely by said conveyor, and wherein a haulage chain is attached to said arm for moving the machine in both directions lengthwise of said armoured face conveyor.

References Cited

UNITED STATES PATENTS 2,935,310   5/1960   Davies _____ 299—43

FOREIGN PATENTS 592,754   2/1934   Germany.

ERNEST R. PURSER, *Primary Examiner.*

U.S. Cl. X.R.

299—51